(12) United States Patent
Jain et al.

(10) Patent No.: US 10,999,893 B2
(45) Date of Patent: *May 4, 2021

(54) MANAGEMENT OF ENHANCED COVERAGE (EC) IN FIFTH GENERATION (5G) SYSTEMS

(71) Applicant: Intel Corporation, Santa Clara, CA (US)

(72) Inventors: Puneet Jain, Hillsboro, OR (US); Ching-Yu Liao, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 23 days.

This patent is subject to a terminal disclaimer.

(21) Appl. No.: 16/274,859

(22) Filed: Feb. 13, 2019

(65) Prior Publication Data
US 2019/0182897 A1     Jun. 13, 2019

Related U.S. Application Data

(60) Provisional application No. 62/630,107, filed on Feb. 13, 2018.

(51) Int. Cl.
*H04W 88/06* (2009.01)
*H04W 48/04* (2009.01)
(Continued)

(52) U.S. Cl.
CPC .......... *H04W 88/06* (2013.01); *H04W 4/80* (2018.02); *H04W 8/22* (2013.01); *H04W 8/24* (2013.01);
(Continued)

(58) Field of Classification Search
CPC ..... H04W 88/06; H04W 48/04; H04W 48/02; H04W 48/20; H04W 8/20; H04W 8/22;
(Continued)

(56) References Cited

U.S. PATENT DOCUMENTS

| 2019/0174449 A1 | 6/2019 | Shan et al. |
| 2019/0253944 A1 | 8/2019 | Kim |

(Continued)

OTHER PUBLICATIONS

"U.S. Appl. No. 16/406,776, Non Final Office Action dated Sep. 16, 2020", 15 pgs.

(Continued)

*Primary Examiner* — Jianye Wu
(74) *Attorney, Agent, or Firm* — Schwegman Lundberg & Woessner, P.A.

(57) ABSTRACT

User equipment (UE) includes processing circuitry. To configure the UE for enhanced coverage (EC) in a 5G network, the processing circuitry is to encode N1 configuration request signaling for transmission to an Access and Mobility Function (AMF) of the 5G network. The N1 configuration request signaling includes an EC support capability indication of whether the UE supports restriction for EC. An N1 configuration response signaling is decoded from the AMF, the N1 configuration response signaling including EC restriction information. The EC restriction information is determined based on the EC support capability indication and subscription information of the UE. An enhanced coverage restriction determination is performed using the EC restriction information. A cell is selected from a plurality of available cells within the 5G network based on the enhanced coverage restriction determination.

20 Claims, 10 Drawing Sheets

(51) Int. Cl.
*H04W 4/80* (2018.01)
*H04W 60/02* (2009.01)
*H04W 8/24* (2009.01)
*H04W 8/22* (2009.01)
*H04W 48/02* (2009.01)
*H04W 60/00* (2009.01)
*H04W 8/20* (2009.01)
*H04W 48/20* (2009.01)

(52) U.S. Cl.
CPC ........... *H04W 48/02* (2013.01); *H04W 48/04* (2013.01); *H04W 60/02* (2013.01); *H04W 8/20* (2013.01); *H04W 48/20* (2013.01); *H04W 60/00* (2013.01)

(58) Field of Classification Search
CPC ....... H04W 8/24; H04W 60/02; H04W 60/00; H04W 4/80
See application file for complete search history.

(56) References Cited

U.S. PATENT DOCUMENTS

2020/0100088 A1    3/2020  Kim et al.
2020/0128420 A1    4/2020  Ryu
2020/0137675 A1*   4/2020  Park ................. H04W 80/10

OTHER PUBLICATIONS

"U.S. Appl. No. 16/406,776, Response filed Nov. 30, 2020 to Non Final Office Action dated Sep. 16, 2020", 12 pgs.
"U.S. Appl. No. 16/406,776, Final Office Action dated Dec. 15, 2020", 13 pgs.
"U.S. Appl. No. 16/406,776, Response filed Feb. 12, 2021 to Final Office Action dated Dec. 15, 2020", 12 pgs.
"U.S. Appl. No. 16/406,776, Examiner Interview Summary dated Feb. 18, 2021", 2 pgs.
"U.S. Appl. No. 16/406,776, Notice of Allowance dated Feb. 26, 2021", 6 pgs.

* cited by examiner

MANAGEMENT OF ENHANCED COVERAGE (EC) IN FIFTH GENERATION (5G) SYSTEMS

PRIORITY CLAIM

This application claims the benefit of priority to the U.S. Provisional Patent Application Ser. No. 62/630,107, filed Feb. 13, 2018, and entitled "MANAGEMENT OF ENHANCED COVERAGE IN FIFTH GENERATION (5G) SYSTEMS," which patent application is incorporated herein by reference in its entirety.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, and fifth-generation (5G) networks including 5G new radio (NR) (or 5G-NR) networks and 5G-LTE networks. Other aspects are directed to systems and methods for managing enhanced coverage (EC) in 5G systems.

BACKGROUND

Mobile communications have evolved significantly from early voice systems to today's highly sophisticated integrated communication platform. With the increase in different types of devices communicating with various network devices, usage of 3GPP LTE systems has increased. The penetration of mobile devices (user equipment or UEs) in modern society has continued to drive demand for a wide variety of networked devices in a number of disparate environments. Fifth generation (5G) wireless systems are forthcoming and are expected to enable even greater speed, connectivity, and usability. Next generation 5G networks (or NR networks) are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in unlicensed spectrum without requiring an "anchor" in the licensed spectrum, called MulteFire. MulteFire combines the performance benefits of LTE technology with the simplicity of Wi-Fi-like deployments.

Further enhanced operation of LTE systems in the licensed as well as unlicensed spectrum is expected in future releases and 5G systems. Such enhanced operations can include techniques to address management of enhanced coverage (EC) in 5G systems.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Figure 1A:
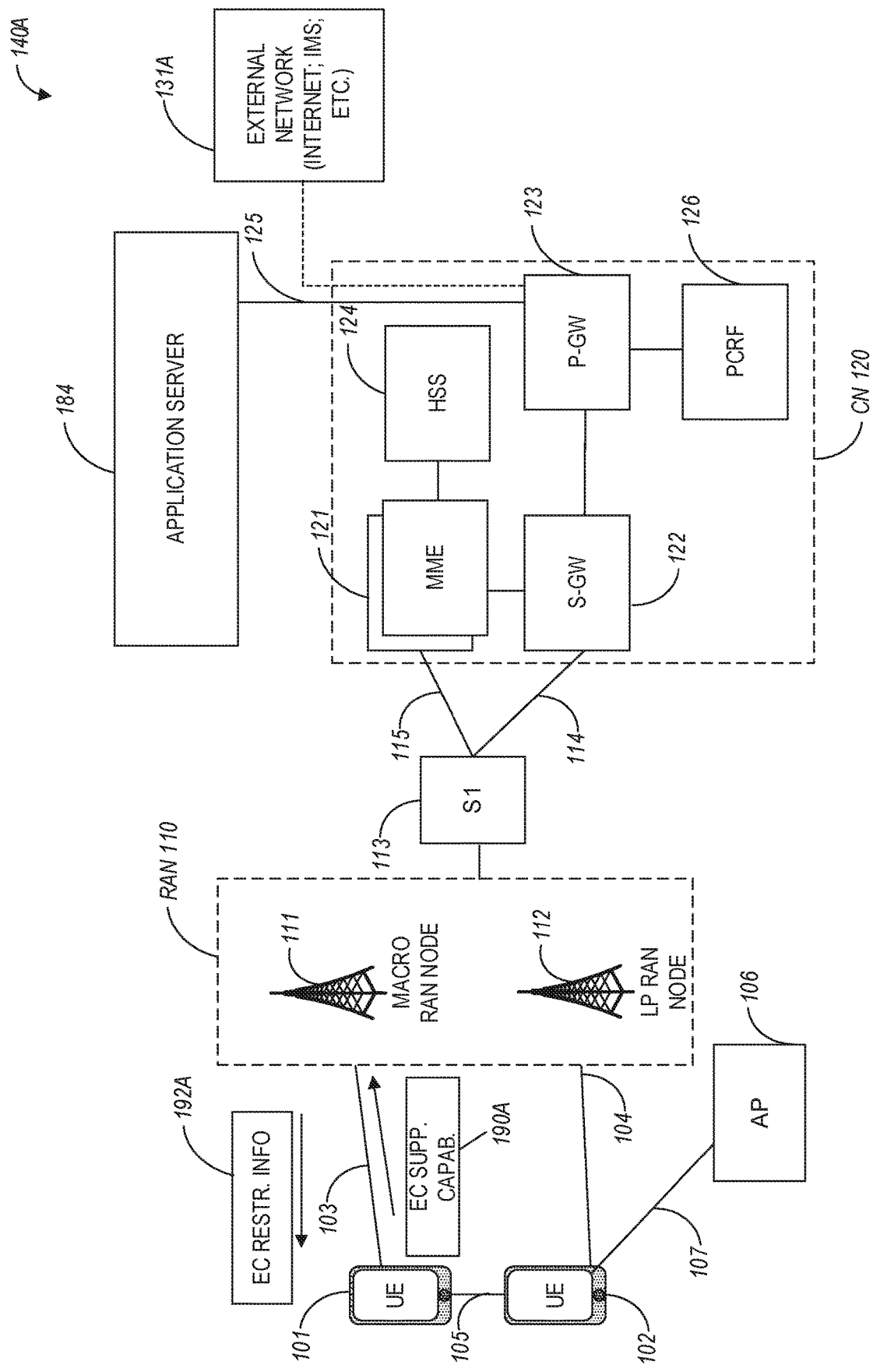
FIG. 1A illustrates an architecture of a network, in accordance with some aspects.

FIG. 1A illustrates an architecture of a network in accordance with some aspects. The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some aspects, carrier aggregation may be used where one or more component carriers operate on unlicensed frequencies.

There are emerging interests in the operation of LTE systems in the unlicensed spectrum. As a result, an important enhancement for LTE in 3GPP Release 13 has been to enable its operation in the unlicensed spectrum via Licensed-Assisted Access (LAA), which expands the system bandwidth by utilizing the flexible carrier aggregation (CA) framework introduced by the LTE-Advanced system. Rel-13 LAA system focuses on the design of downlink operation on unlicensed spectrum via CA, while Rel-14 enhanced LAA (eLAA) system focuses on the design of uplink operation on unlicensed spectrum via CA.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies). Applicable exemplary spectrum bands include IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, to name a few), IMT-advanced spectrum, IMT-2020 spectrum (expected to include 3600-3800 MHz, 3.5 GHz bands, 700 MHz bands, bands within the 24.25-86 GHz range, for example), spectrum made available under the Federal Communications Commission's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz), WiGig Band 3 (61.56-63.72 GHz), and WiGig Band 4 (63.72-65.88 GHz); the 70.2 GHz-71 GHz band; any band between 65.88 GHz and 71 GHz; bands currently allocated to automotive radar applications such as 76-81 GHz; and future bands including 94-300 GHz and above. Furthermore, the scheme can be used on a secondary basis on bands such as the TV White Space bands (typically below 790 MHz) wherein particular the 400 MHz and 700 MHz bands can be employed. Besides cellular applications, specific applications for vertical markets may be addressed, such as PMSE (Program Making and Special Events), medical, health, surgery, automotive, low-latency, drones, and the like.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, NB-IoT devices can be configured to operate in a single physical resource block (PRB) and may be instructed to retune two different PRBs within the system bandwidth. In some aspects, an eNB-IoT UE can be configured to acquire system information in one PRB, and then it can retune to a different PRB to receive or transmit data.

In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In some aspects, the network 140A can include a core network (CN) 120. Various aspects of NG RAN and NG Core are discussed herein in reference to, e.g., FIG. 1B, FIG. 1C, FIG. 1D, and FIG. 1E.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation node-B (gNB), an evolved node-B (eNB), or another type of RAN node.

In accordance with some aspects, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe for sidelink communications), although such aspects are not required. The OFDM signals can comprise a plurality of orthogonal subcarriers.

In some aspects, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation may be used for OFDM systems, which makes it applicable for radio resource allocation. Each column and each row of the resource grid may correspond to one OFDM symbol and one OFDM subcarrier, respectively. The duration of the resource grid in the time domain may correspond to one slot in a radio frame. The smallest time-frequency unit in a resource grid may be denoted as a resource element. Each resource grid may comprise a number of resource blocks, which describe the mapping of certain physical channels to resource elements. Each resource block may comprise a collection of resource elements; in the frequency domain, this may, in some aspects, represent the smallest quantity of resources that currently can be allocated. There may be several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (as-signing control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some aspects may use concepts for resource allocation for control channel information that are an extension of the above-described concepts. For example, some aspects may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs according to some arrangements.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1I). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123. The application server 184 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 184.

In an example, any of the nodes 111 or 112 can be configured to communicate to the UEs 101, 102 (e.g., dynamically) an antenna panel selection and a receive (Rx) beam selection that can be used by the UE for data reception on a physical downlink shared channel (PDSCH) as well as for channel state information reference signal (CSI-RS) measurements and channel state information (CSI) calculation.

In an example, any of the nodes 111 or 112 can be configured to communicate to the UEs 101, 102 (e.g., dynamically) an antenna panel selection and a transmit (Tx) beam selection that can be used by the UE for data transmission on a physical uplink shared channel (PUSCH) as well as for sounding reference signal (SRS) transmission.

In some aspects, the communication network 140A can be an IoT network. One of the current enablers of IoT is the narrowband-IoT (NB-IoT). NB-IoT has objectives such as coverage extension, UE complexity reduction, long battery lifetime, and backward compatibility with the LTE network. In addition, NB-IoT aims to offer deployment flexibility allowing an operator to introduce NB-IoT using a small portion of its existing available spectrum, and operate in one of the following three modalities: (a) standalone deployment (the network operates in re-farmed GSM spectrum); (b) in-band deployment (the network operates within the LTE channel); and (c) guard-band deployment (the network operates in the guard band of legacy LTE channels). In some aspects, such as with further enhanced NB-IoT (FeNB-IoT), support for NB-IoT in small cells can be provided (e.g., in microcell, picocell or femtocell deployments). One of the challenges NB-IoT systems face for small cell support is the UL/DL link imbalance, where for small cells the base stations have lower power available compared to macrocells, and, consequently, the DL coverage can be affected and/or reduced. In addition, some NB-IoT UEs can be configured to transmit at maximum power if repetitions are used for UL transmission. This may result in large inter-cell interference in dense small cell deployments.

In some aspects, the UE 101 can support connectivity to a 5G core network (5GCN) and can be configured to operate with Early Data Transmission (EDT) in a communication architecture that supports one or more of Machine Type Communications (MTC), enhanced MTC (eMTC), further enhanced MTC (feMTC), even further enhanced MTC (efeMTC), and narrowband Internet-of-Things (NB-IoT) communications. When operating with EDT, a physical random access channel (PRACH) procedure message 3 (MSG3) can be used to carry the short uplink (UL) data and PRACH procedure message 4 (MSG4) can be used to carry short downlink (DL) data (if any is available). When a UE wants to make a new RRC connection, it first transmits one or more preambles, which can be referred to as PRACH procedure message 1 (MSG1). The MSG4 can also indicate UE to immediately go to IDLE mode. For this purpose, the transport block size (TBS) scheduled by the UL grant received for the MSG3 to transmit UL data for EDT needs to be larger than the TBS scheduled by the legacy grant. In some aspects, the UE can indicate its intention of using the early data transmission via MSG1 using a separate PRACH resource partition. From MSG1, eNB knows that it has to provide a grant scheduling TBS values that may differ from legacy TBS for MSG3 in the random-access response (RAR or MSG2) so that the UE can transmit UL data in MSG3 for EDT. However, the eNB may not exactly know what would be the size of UL data the UE wants to transmit for EDT and how large a UL grant for MSG3 would be needed, though a minimum and a maximum TBS for the UL grant could be defined. The following two scenarios may occur: (a) The UL grant provided in RAR is larger than the UL data plus header. In this case, layer 1 needs to add one or more padding bits in the remaining grant. However, transmitting a large number of padding bits (or useless bits) is not power efficient especially in deep coverage where a larger number of repetitions of transmission is required. (b) Similarly, when the UL grant provided in RAR is large but falls short to accommodate the UL data for the EDT, the UE may have to send only the legacy RRC message to fallback to legacy RRC connection. In this case, UE may again need to transmit a number of padding bits, which can be inefficient.

As used herein, the term "PRACH procedure" can be used interchangeably with the term "Random Access procedure" or "RA procedure".

In some aspects and as described hereinbelow, UE 101 can be configured for enhanced coverage (EC) operation within the system architecture 140A. More specifically, UE 101 can communicate EC support capabilities 190A to the RAN 110 and the CN 120. For example, the CN 120 can include an AMF entity (e.g., AMF 132 in FIG. 1B) and the EC support capabilities 190A of UE 101 can be communicated to the AMF entity via an N1 interface. The EC support capabilities 190A can indicate whether or not UE 101 supports a restriction of EC. EC restriction information 192A can be communicated back to the UE 101 based on the EC support capabilities 190A, UE subscription information, UE usage settings, PLMN policy associated with CN 120, and/or other factors. The EC restriction information 192A can indicate whether coverage enhancement (CE) mode B is restricted for UE 101, whether both CE mode A and CE mode B are restricted for the UE, or whether both CE mode A and CE mode B are not restricted for the UE.

Figure 1B:
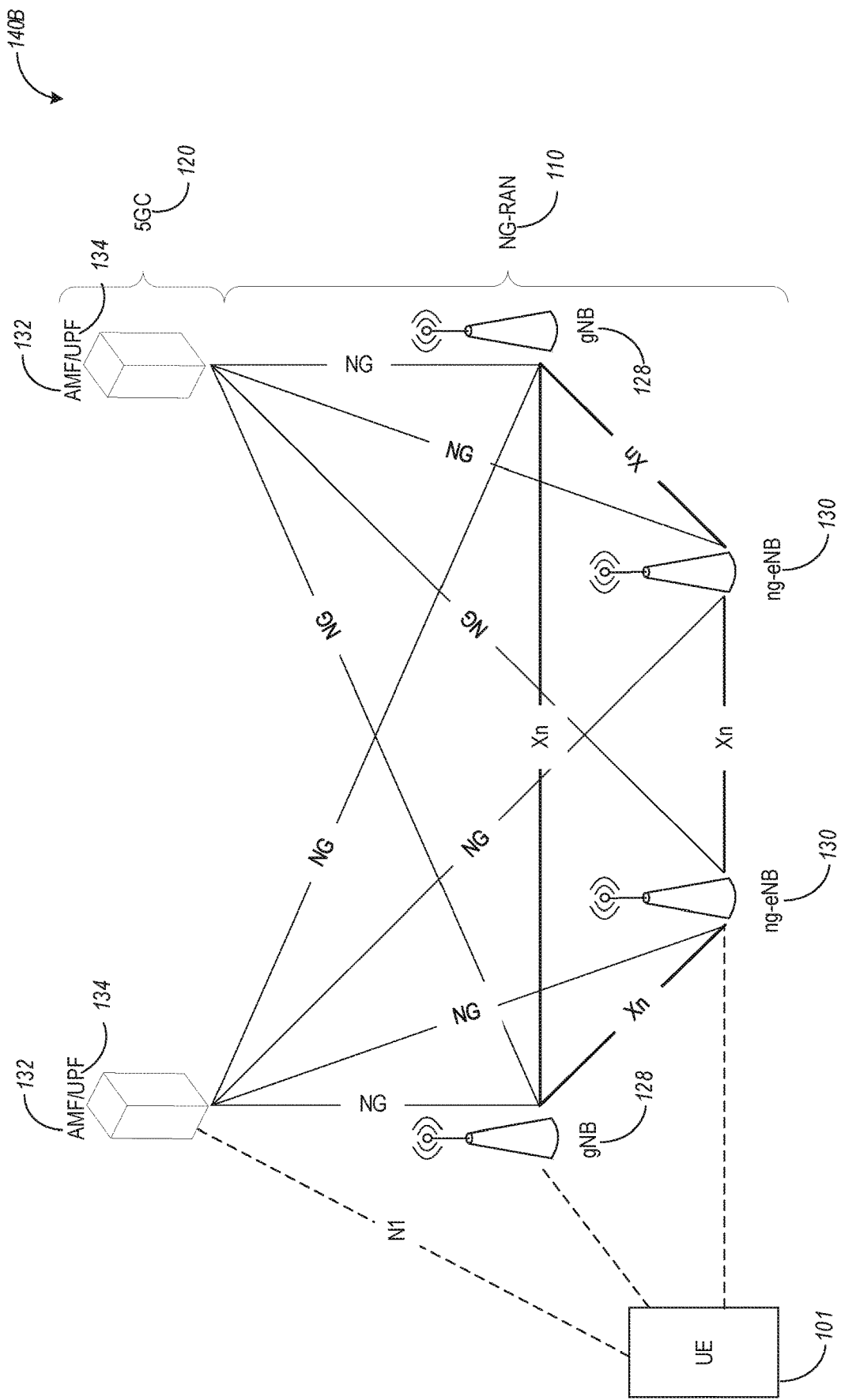
FIG. 1B is a simplified diagram of an overall next generation (NG) system architecture, in accordance with some aspects.

FIG. 1B is a simplified diagram of a next generation (NG) system architecture 140B in accordance with some aspects. Referring to FIG. 1B, the NG system architecture 140B includes RAN 110 and a 5G network core (5GC) 120. The NG-RAN 110 can include a plurality of nodes, such as gNBs 128 and NG-eNBs 130.

The core network 120 (e.g., a 5G core network or 5GC) can include an access and mobility function (AMF) 132 and/or a user plane function (UPF) 134. The AMF 132 and the UPF 134 can be communicatively coupled to the gNBs 128 and the NG-eNBs 130 via NG interfaces. More specifically, in some aspects, the gNBs 128 and the NG-eNBs 130 can be connected to the AMF 132 by NG-C interfaces, and to the UPF 134 by NG-U interfaces. The gNBs 128 and the NG-eNBs 130 can be coupled to each other via Xn interfaces.

In some aspects, a gNB 128 can include a node providing new radio (NR) user plane and control plane protocol termination towards the UE and is connected via the NG interface to the 5GC 120. In some aspects, an NG-eNB 130 can include a node providing evolved universal terrestrial radio access (E-UTRA) user plane and control plane protocol terminations towards the UE and is connected via the NG interface to the 5GC 120.

In some aspects, the NG system architecture 140B can use reference points between various nodes as provided by 3GPP Technical Specification (TS) 23.501 (e.g., V15.4.0, 2018-12).

In some aspects, each of the gNBs 128 and the NG-eNBs 130 can be implemented as a base station, a mobile edge server, a small cell, a home eNB, and so forth.

In some aspects, node 128 can be a master node (MN) and node 130 can be a secondary node (SN) in a 5G architecture. The MN 128 can be connected to the AMF 132 via an NG-C interface and to the SN 128 via an XN-C interface. The MN 128 can be connected to the UPF 134 via an NG-U interface and to the SN 128 via an XN-U interface.

Figure 1C:
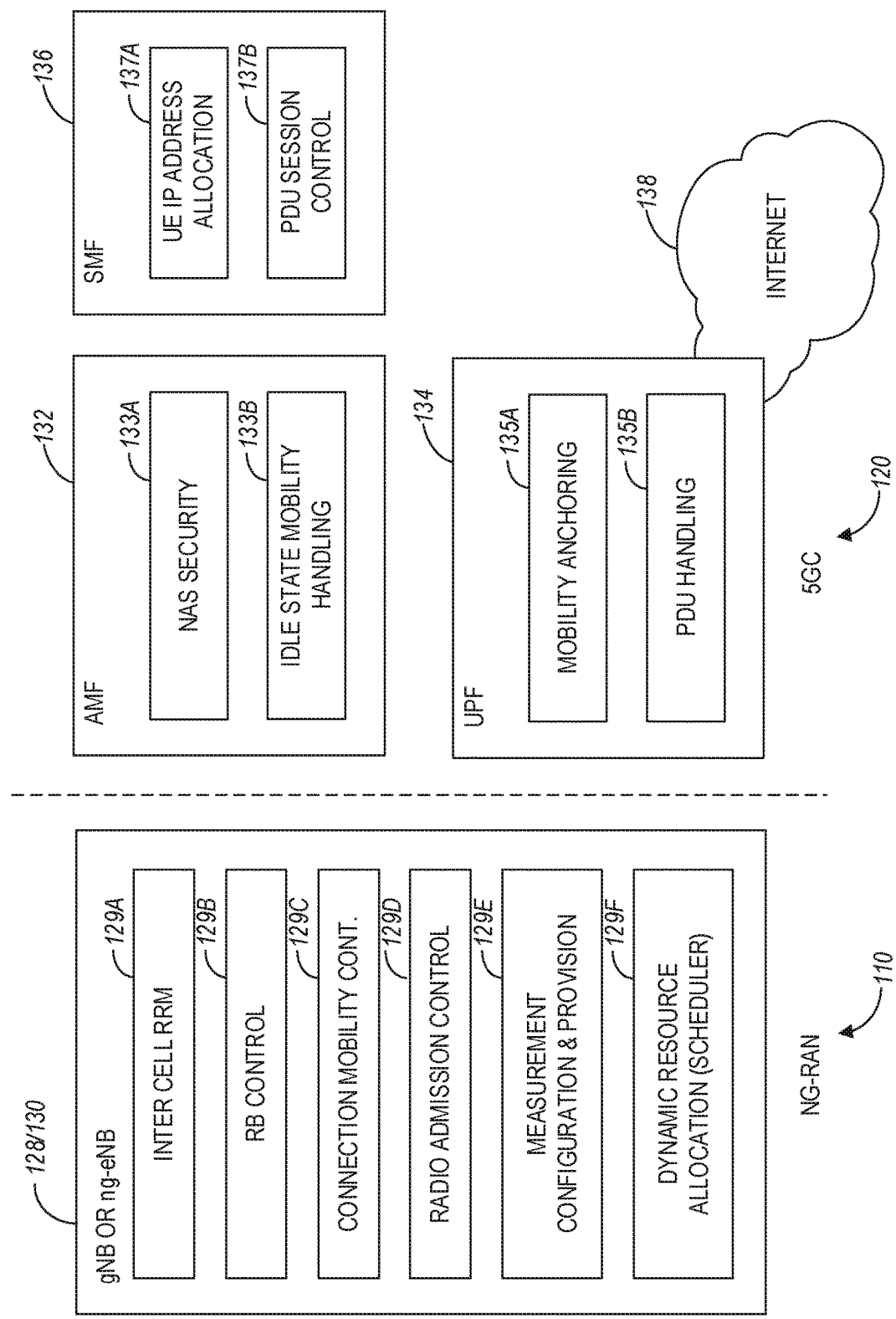
FIG. 1C illustrates a functional split between next generation radio access network (NG-RAN) and the 5G Core network (5GC), in accordance with some aspects.

FIG. 1C illustrates a functional split between NG-RAN and the 5G Core (5GC) in accordance with some aspects. Referring to FIG. 1C, there is illustrated a more detailed diagram of the functionalities that can be performed by the gNBs 128 and the NG-eNBs 130 within the NG-RAN 110, as well as the AMF 132, the UPF 134, and the SMF 136 within the 5GC 120. In some aspects, the 5GC 120 can provide access to the Internet 138 to one or more devices via the NG-RAN 110.

In some aspects, the gNBs 128 and the NG-eNBs 130 can be configured to host the following functions: functions for Radio Resource Management (e.g., inter-cell radio resource management 129A, radio bearer control 129B, connection mobility control 129C, radio admission control 129D, dynamic allocation of resources to UEs in both uplink and downlink (scheduling) 129F); IP header compression, encryption and integrity protection of data; selection of an AMF at UE attachment when no routing to an AMF can be determined from the information provided by the UE; routing of User Plane data towards UPF(s); routing of Control Plane information towards AMF; connection setup and release; scheduling and transmission of paging messages (originated from the AMF); scheduling and transmission of system broadcast information (originated from the AMF or Operation and Maintenance); measurement and measurement reporting configuration for mobility and scheduling 129E; transport level packet marking in the uplink; session management; support of network slicing; QoS flow management and mapping to data radio bearers; support of UEs in RRC_INACTIVE state; distribution function for non-access stratum (NAS) messages; radio access network sharing; dual connectivity; and tight interworking between NR and E-UTRA, to name a few.

In some aspects, the AMF 132 can be configured to host the following functions, for example: NAS signaling termination; NAS signaling security 133A; access stratum (AS) security control; inter-core network (CN) node signaling for mobility between 3GPP access networks; idle state/mode mobility handling 133B, including mobile device, such as a UE reachability (e.g., control and execution of paging retransmission); registration area management; support of intra-system and inter-system mobility; access authentication; access authorization including check of roaming rights; mobility management control (subscription and policies); support of network slicing; and/or SMF selection, among other functions.

The UPF 134 can be configured to host the following functions, for example: mobility anchoring 135A (e.g., anchor point for Intra-/Inter-RAT mobility); packet data unit (PDU) handling 135B (e.g., external PDU session point of interconnect to data network); packet routing and forwarding; packet inspection and user plane part of policy rule enforcement; traffic usage reporting; uplink classifier to support routing traffic flows to a data network; branching point to support multi-homed PDU session; QoS handling for user plane, e.g., packet filtering, gating, UL/DL rate enforcement; uplink traffic verification (SDF to QoS flow mapping); and/or downlink packet buffering and downlink data notification triggering, among other functions.

The Session Management function (SMF) 136 can be configured to host the following functions, for example: session management; UE IP address allocation and management 137A; selection and control of user plane function (UPF); PDU session control 137B, including configuring traffic steering at UPF 134 to route traffic to proper destination; control part of policy enforcement and QoS; and/or downlink data notification, among other functions.

Figure 1D:
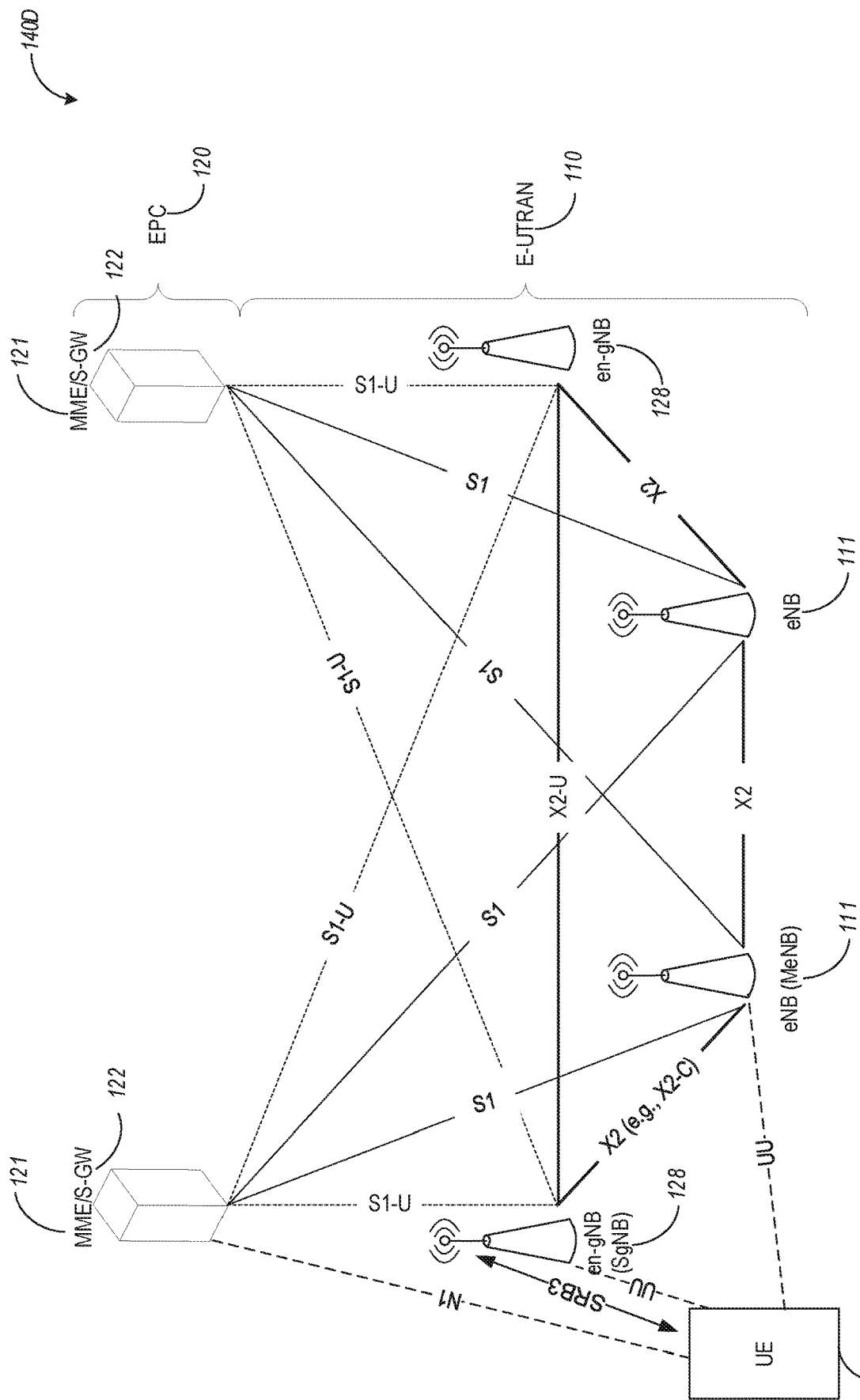
FIG. 1D illustrates an example Evolved Universal Terrestrial Radio Access (E-UTRA) New Radio Dual Connectivity (EN-DC) architecture, in accordance with some aspects.

FIG. 1D illustrates an example Evolved Universal Terrestrial Radio Access (E-UTRA) New Radio Dual Connectivity (EN-DC) architecture, in accordance with some aspects. Referring to FIG. 1D, the EN-DC architecture 140D includes radio access network (or E-TRA network, or E-TRAN) 110 and EPC 120. The EPC 120 can include MMEs 121 and S-GWs 122. The E-UTRAN 110 can include nodes 111 (e.g., eNBs) as well as Evolved Universal Terrestrial Radio Access New Radio (EN) next generation evolved Node-Bs (en-gNBs) 128.

In some aspects, en-gNBs 128 can be configured to provide NR user plane and control plane protocol terminations towards the UE 102 and acting as Secondary Nodes (or SgNBs) in the EN-DC communication architecture 140D. The eNBs 111 can be configured as master nodes (or MeNBs) and the eNBs 128 can be configured as secondary nodes (or SgNBs) in the EN-DC communication architecture 140D. As illustrated in FIG. 1D, the eNBs 111 are connected to the EPC 120 via the S1 interface and to the EN-gNBs 128 via the X2 interface. The EN-gNBs (or SgNBs) 128 may be connected to the EPC 120 via the S1-U interface, and to other EN-gNBs via the X2-U interface. The SgNB 128 can communicate with the UE 102 via a UU interface (e.g., using signaling radio bearer type 3, or SRB3 communications as illustrated in FIG. 1D), and with the MeNB 111 via an X2 interface (e.g., X2-C interface). The MeNB 111 can communicate with the UE 102 via a UU interface.

Even though FIG. 1D is described in connection with EN-DC communication environment, other types of dual connectivity communication architectures (e.g., when the UE 102 is connected to a master node and a secondary node) can also use the techniques disclosed herein.

In some aspects, the MeNB 111 can be connected to the MME 121 via S1-MME interface and to the SgNB 128 via an X2-C interface. In some aspects, the MeNB 111 can be connected to the SGW 122 via S1-U interface and to the SgNB 128 via an X2-U interface. In some aspects associated with dual connectivity (DC) and/or MultiRate-DC (MR-DC), the Master eNB (MeNB) can offload user plane traffic to the Secondary gNB (SgNB) via split bearer or SCG (Secondary Cell Group) split bearer.

Figure 1E:
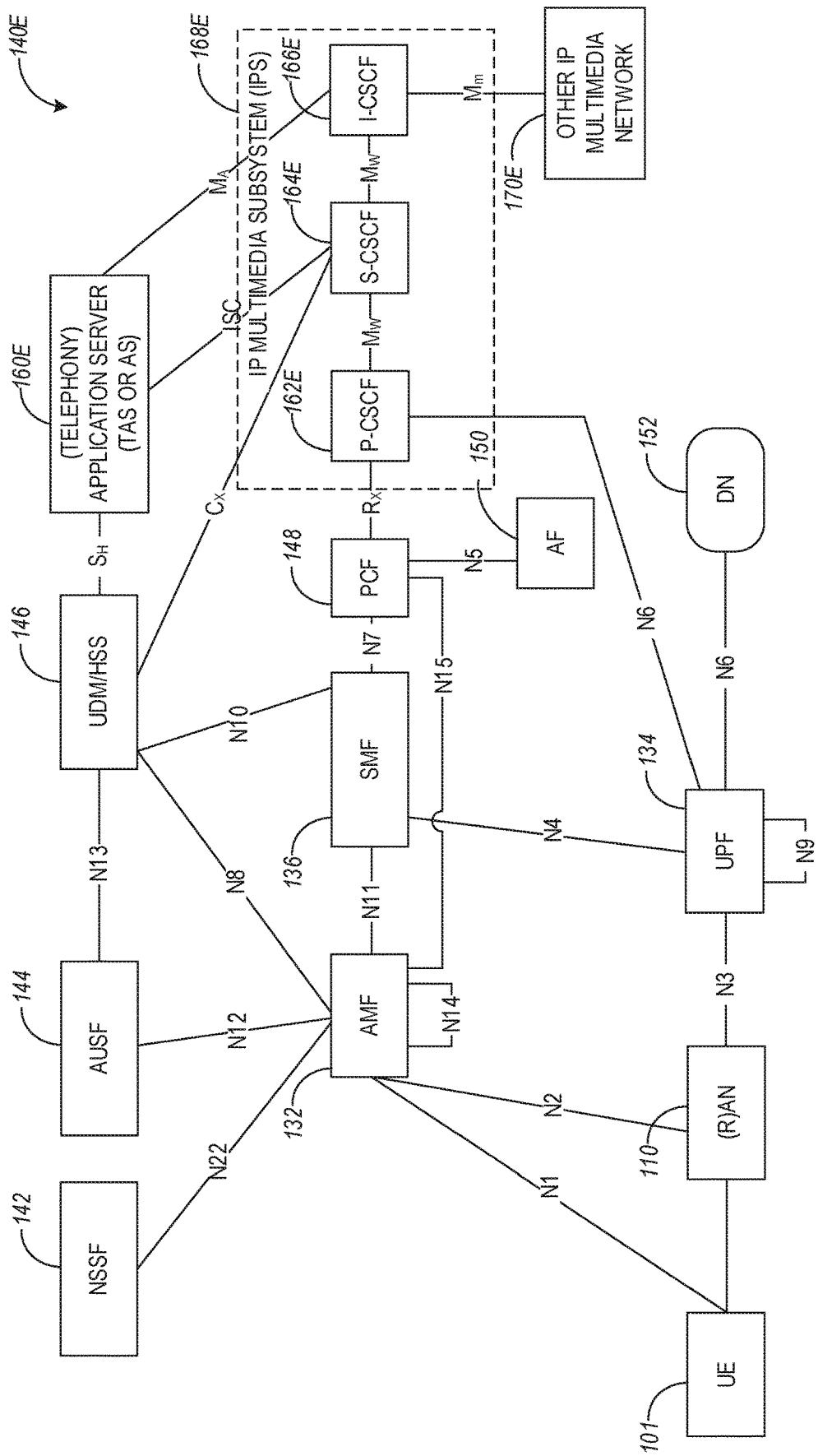
FIG. 1E illustrates a non-roaming 5G system architecture in accordance with some aspects.

FIG. 1E illustrates a non-roaming 5G system architecture in accordance with some aspects. Referring to FIG. 1E, there is illustrated a 5G system architecture 140E in a reference point representation. More specifically, UE 102 can be in communication with RAN 110 as well as one or more other 5G core (5GC) network entities. The 5G system architecture 140E includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to a network policy. The UPF 134 can be deployed in one or more configurations according to a desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

In some aspects, the 5G system architecture 140E includes an IP multimedia subsystem (IMS) 168E as well as a plurality of IP multimedia core network subsystem entities, such as call session control functions (CSCFs). More specifically, the IMS 168E includes a CSCF, which can act as a proxy CSCF (P-CSCF) 162E, a serving CSCF (S-CSCF) 164E, an emergency CSCF (E-CSCF) (not illustrated in FIG. 1E), or interrogating CSCF (I-CSCF) 166E. The P-CSCF 162E can be configured to be the first contact point for the UE 102 within the IM subsystem (IMS) 168E. The S-CSCF 164E can be configured to handle the session states in the network, and the E-CSCF can be configured to handle certain aspects of emergency sessions such as routing an emergency request to the correct emergency center or PSAP. The I-CSCF 166E can be configured to function as the contact point within an operator's network for all IMS connections destined to a subscriber of that network operator, or a roaming subscriber currently located within that network operator's service area. In some aspects, the I-CSCF 166E can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160E can be coupled to the IMS 168E via the S-CSCF 164E or the I-CSCF 166E. In some aspects, the 5G system architecture 140E can use unified access barring mechanism using one or more of the techniques described herein, which access barring mechanism can be applied for all RRC states of the UE 102, such as RRC_IDLE, RRC_CONNECTED, and RRC_INACTIVE states.

In some aspects, the 5G system architecture 140E can be configured to use 5G access control mechanism techniques described herein, based on access categories that can be categorized by a minimum default set of access categories, which are common across all networks. This functionality can allow the public land mobile network PLMN, such as a visited PLMN (VPLMN) to protect the network against different types of registration attempts, enable acceptable service for the roaming subscriber and enable the VPLMN to control access attempts aiming at receiving certain basic services. It also provides more options and flexibility to individual operators by providing a set of access categories, which can be configured and used in operator-specific ways.

A reference point representation shows that interaction can exist between corresponding NF services. For example, FIG. 1E illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1E can also be used.

In some aspects, both NB-IoT and WB-E-UTRA, with enhancements for MTC radio access technologies can be used in 5G to provide radio access support for massive IoT. Both of these RATs support enhanced coverage (EC) based on radio signal repetitions. Radio signal repetition is costly and, therefore, management of the EC functionalities is important from an overall system cost perspective.

In some aspects, the following functionalities can be supported in a wireless architecture with EC: enable an Application Server/Function to query the status of the enhanced coverage restriction for a UE; means for the 5GC to restrict UE usage of the EC feature; enable an Application Server/Function to enable, or to disable the EC restriction for a particular UE; temporary storage of 10*o* RAN parameters in 5GC, related to the EC feature; indication of UE capability of CE mode B support to the 5GC; and storage of restriction of use of EC as part of subscription parameter in UDM.

Support of Enhanced Coverage

In some aspects, UE 101 can be configured to indicate its capability of support for Enhanced Coverage (or EC support capabilities 190A) (i.e., CE mode B capability support) to the AMF over N1 signaling (e.g., during the Initial Registration, or using a Periodic Registration request message, or using a service request message). The AMF stores the UE capability of support for enhanced coverage in the UE context at the AMF.

In some aspects, the UE may also indicate its capability for CE mode A support (i.e., CE mode A capability support indication) either separately or together with CE mode B capability support indication using an N1 signaling message to the AMF (e.g., during an initial registration request, a periodic registration request message, or a service request message).

Support of Restriction of Use of Enhanced Coverage

In some aspects, the usage of EC may require the use of extensive resources (e.g. radio and signaling resources) from the network. Specific subscribers can be restricted to use the EC feature through Enhanced Coverage Restriction information that is stored in the UDM as part of subscription data and specifies per PLMN whether the EC functionality is restricted or not for the UE. The Enhanced Coverage Restriction information indicates whether CE mode B is restricted for the UE, or both CE mode A and CE mode B is restricted for the UE, or both CE mode A and CE mode B is not restricted for the UE.

In some aspects, the AMF receives the Enhanced Coverage Restriction information from the UDM during a registration procedure. The AMF, based on local configuration, UE usage setting, UE subscription information and network policies, or any combination thereof, determines whether Enhanced Coverage (i.e., CE mode B, or both CE mode B and CE mode A) is restricted for the UE and stored updated Enhanced Coverage restriction information in the UE context in the AMF. If the UE usage setting indicated that UE is "voice-centric" then the AMF can set CE mode B restricted for the UE in the Enhanced Coverage restriction information.

In some aspects, the AMF sends Enhanced Coverage Restriction information (e.g., 192A) to the UE in the Registration Accept message. The UE can use the Enhanced Coverage Restriction information to determine if Enhanced Coverage is restricted or not. The AMF can provide an Enhanced Coverage Restriction information to the (R)AN via N2 signaling whenever the UE context is established in the RAN, e.g., during an N2 Paging procedure, a Service Request procedure, an initial Registration, or a periodic Registration procedure.

In some aspects, for roaming UEs, if the UDM does not provide any Enhanced Coverage Restriction information or the provided Enhanced Coverage Restriction information is in conflict with the roaming agreement, the AMF can use default Enhanced Coverage Restriction information locally configured in the VPLMN based on the roaming agreement with the subscriber's HPLMN.

In some aspects, the UE that indicates its support for EC over an N1 interface can also support restriction of EC over the N1 interface. The UE can assume that restriction for use of EC is the same in the equivalent PLMNs.

In some aspects, the AMF may provide Enhanced Coverage Restriction information on per S-NSSAI basis or on per DNN basis. For Example, if the UE is attached to Single Network Slice Selection Assistance Information (S-NSSAI) #1, Enhanced Coverage may be restricted, while for S-NSSAI #2 Enhanced Coverage may not be restricted. Similarly, for a data network name (DNN), if the UE is attached to DNN #1, Enhanced Coverage may be restricted while for DNN #2 Enhanced Coverage may not be restricted.

In some aspects, the UE may be configured for precedence rule. For Example, if the UE is attached to S-NSSAI #1, which has Enhanced Coverage restricted, then it may be restricted (or not restricted) for all S-NSSAIs. The same example applies to DNN.

In some aspects, UDM may also store CE level (e.g., CE level 1-4) information as part of subscription data, and can provide such information to the AMF along with Enhanced Coverage restriction information. The AMF may also provide CE level information to the UE over N1 signaling and to (R)AN over N2 signaling.

In some aspects, Enhanced Coverage restriction information may be referred to with different terms, such as Enhanced Coverage restriction parameter, Enhanced Coverage Restricted information, Enhanced Coverage restriction indication, CE mode B restriction parameter, CE mode B restriction indication, and so forth.

In some aspects, Enhanced Coverage restriction information may be received by PCF from UDM/UDR. The AMF receives Enhanced Coverage Restriction information from the PCF during the Registration procedure (i.e., Policy Association establishment between AMF and PCF during registration). The AMF may, based on local configuration, UE Usage setting, UE subscription information and network policies, or any combination thereof, determine whether Enhanced Coverage (i.e., CE mode B or both CE mode B and CE mode A) is restricted for the UE, and may store updated Enhanced Coverage restriction information in the UE context at the AMF. If the UE usage setting indicates that the UE is "voice-centric", then the AMF may set CE mode B restricted for the UE in the Enhanced Coverage restriction information.

Support of EPC Interworking

IDLE Mode Aspects

In some aspects, when the UE moves from a 5GS to EPS, the UE context information sent by AMF to MME may include the Enhanced Coverage Restriction information. The MME may determine an Enhanced Coverage Restriction parameter and CE mode B restricted parameter from the Enhanced Coverage Restriction information and may store it in the MME's MM context.

In some aspects, when the UE moves from EPS to 5GS, the MME's MM context information sent by the MME to the AMF includes the Enhanced Coverage Restriction parameter and a CE mode B restricted parameter. The AMF may determine Enhanced Coverage Restriction information from the CE mode B restricted parameter and the Enhanced Coverage Restriction parameter and may store it in the UE context at the AMF.

CONNECTED Mode Aspects

In some aspects, when a UE is CM-CONNECTED in 5GC and a handover to EPS occur, source eNB can provide Enhanced Coverage Restriction information to the target eNB. In some aspects, when a UE is CM-CONNECTED in EPS and a handover to 5GC occur, the source eNB can provide Enhanced Coverage Restriction information to the target eNB.

RRC INACTIVE Aspects

In some aspects, if the UE is in CM-CONNECTED with RRC INACTIVE, then the (R)AN node may page the UE based on the available Enhanced Coverage Restriction Information and optionally available CE level information.

Figure 2:
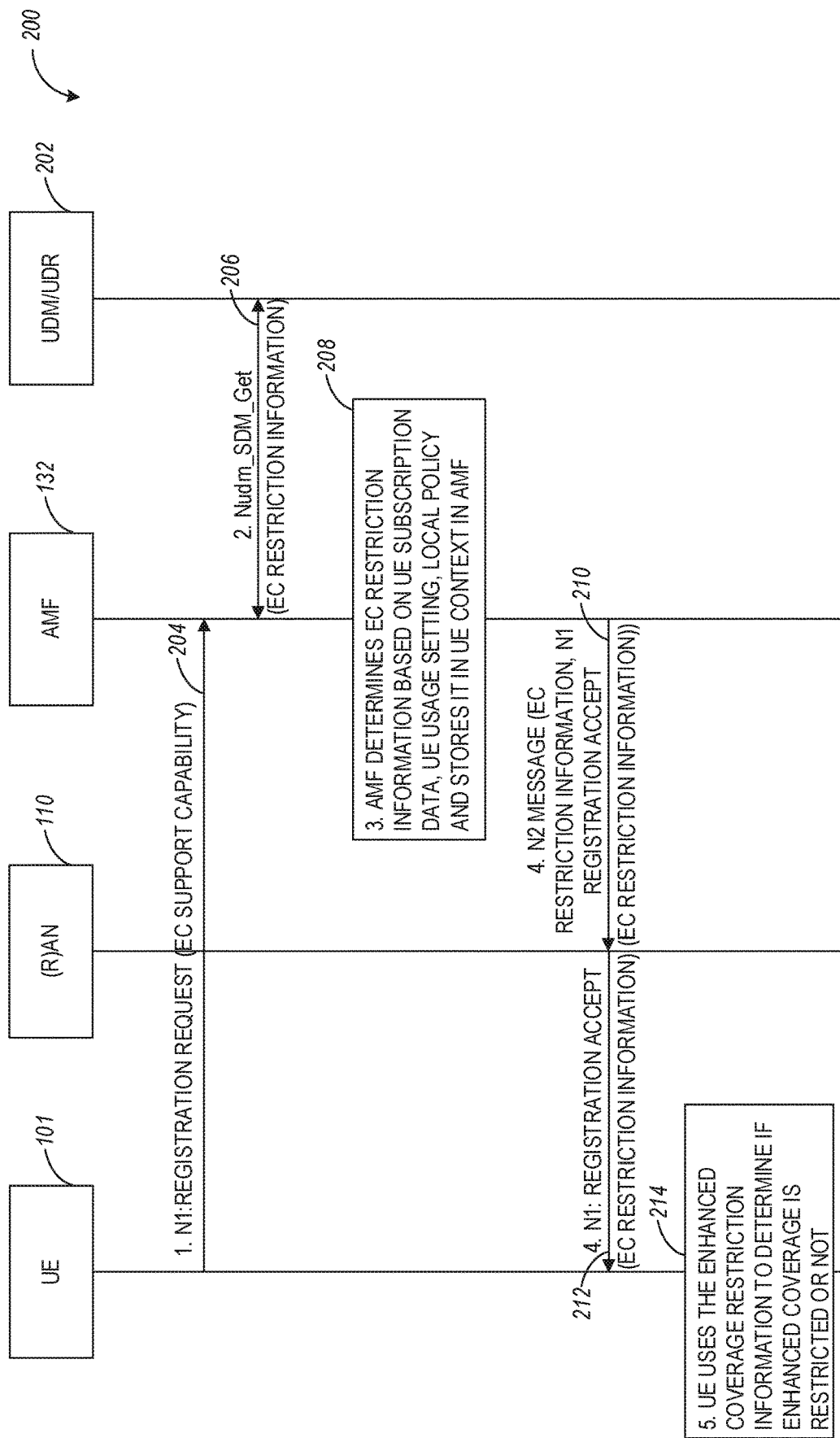
FIG. 2 illustrates a communication flow diagram for restricting the use of enhanced coverage based on Access and Mobility Function (AMF)-Unified Data Management (UDM)/Universal Data Repository (UDR) communication, in accordance with some aspects.

FIG. 2 illustrates a communication flow diagram for restricting the use of enhanced coverage based on AMF- UDM/UDR communication, in accordance with some aspects. More specifically, the communication flow diagram 200 can take place between the following network entities: UE 101, RAN 110, AMF 132 and UDM/UDR 202. The UDM 202 can be the same as UDM/HSS 146 in FIG. 1E. UDR can be a universal data repository within a 5G architecture.

At operation 204, the UE 101 communicates N1 registration request message to the AMF 132 with UE Enhanced Coverage (EC) support capability indication. At operation 206, the AMF 132 retrieves the subscription data for the UE from the UDM 202 using, e.g., Nudm_SDM_Get service operation. The UDM 202 may retrieve this information from a UDR by, e.g., a Nudr_UDM_Query (Access and Mobility Subscription data). The retrieved information also includes the Enhanced Coverage Restriction information (i.e. CE mode B is restricted for the UE, or both CE mode A and CE mode B are restricted for the UE, or both CE mode A and CE mode B are not restricted for the UE).

At operation 208, the AMF 132, based on local configuration, UE usage setting, UE subscription information, and network policies, or any combination thereof, determines whether EC (i.e., CE mode B or both CE mode B and CE mode A) is restricted for the UE, and stores updated EC restriction information in the UE context at the AMF.

At operation 212, the AMF 132 communicates the Enhanced Coverage Restriction information to the UE 101 in a Registration Accept message (or another type of message). At operation 210, the AMF 132 also provides the EC Restriction information to the RAN 110 via, e.g., N2 signaling.

At operation 214, the UE can use the Enhanced Coverage Restriction information to determine if Enhanced Coverage is restricted or not. A RAN cell can be selected based on the EC restriction determination.

In some aspects, different or new service operations may be used between the UDM and the AMF for carrying Enhanced Coverage restriction information.

Figure 3:
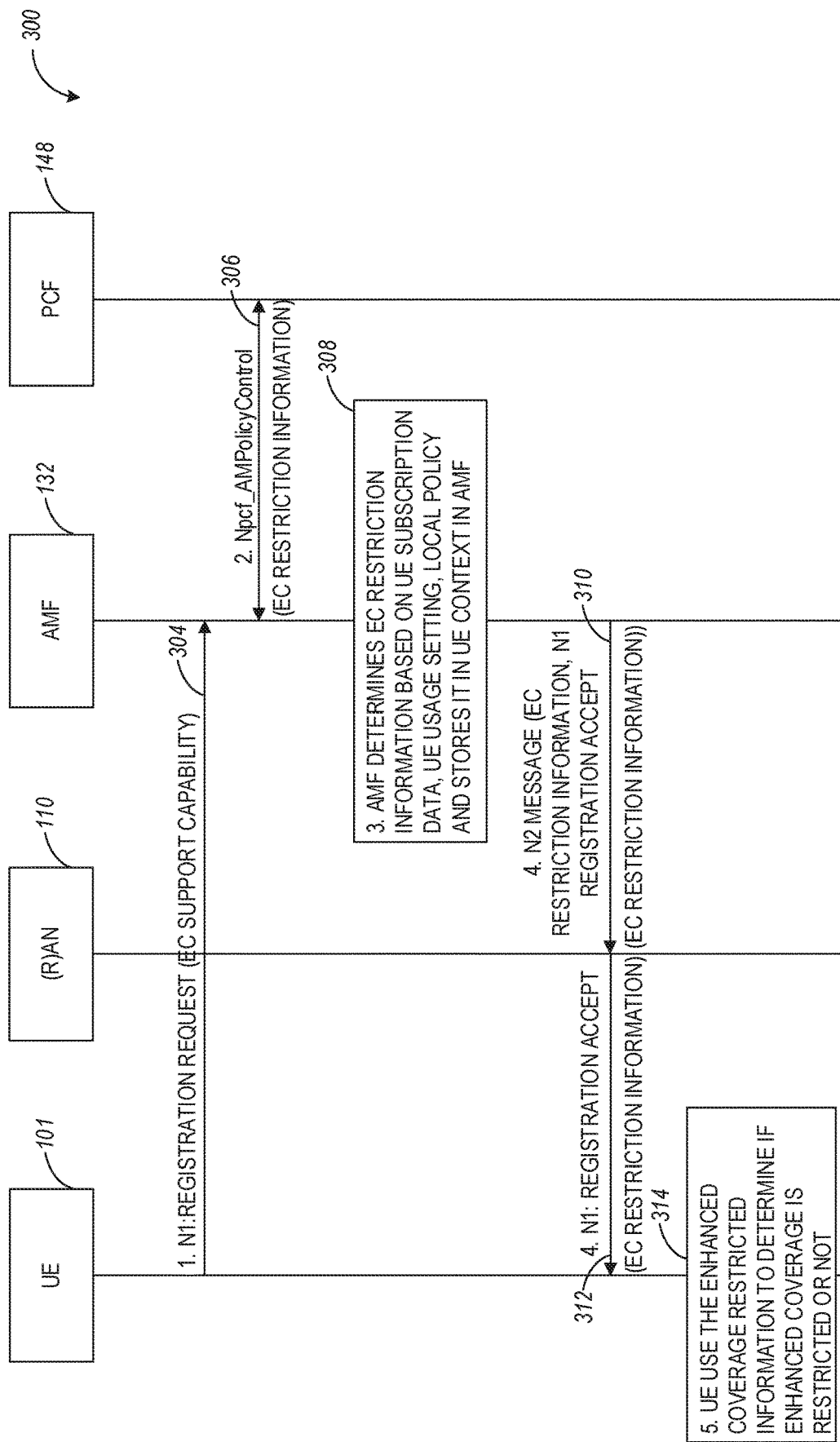
FIG. 3 illustrates a communication flow diagram for restricting the use of enhanced coverage based on AMF-Policy Control Function (PCF) communication, in accordance with some aspects.

FIG. 3 illustrates a communication flow diagram for restricting the use of enhanced coverage based on AMF-PCF communication, in accordance with some aspects. More specifically, the communication flow diagram 300 can take place between the following network entities: UE 101, RAN 110, AMF 132 and PCF 148.

At operation 304, the UE 101 sends an N1 registration request message (or another type of message) to the AMF 132 with the UE Enhanced Coverage (EC) support capability indication. At operation 306, the AMF 132 retrieves the subscription data for the UE from the PCF 148 using, e.g., Npcf_AMPloicyControl ( ) service operation. The PCF 148 can receive this information from the UDR via, e.g., Nudr_UDM_Query (Access and Mobility Subscription data). This information can also include the Enhanced Coverage Restriction information (i.e., CE mode B is restricted for the UE, or both CE mode A and CE mode B is restricted for the UE, or both CE mode A and CE mode B is not restricted for the UE).

At operation 308, the AMF 132, based on local configuration, UE usage setting, UE subscription information, and network policies, or any combination thereof, determines whether Enhanced Coverage (i.e., CE mode B or both CE mode B and CE mode A) is restricted for the UE, and stores the updated Enhanced Coverage restriction information in the UE context managed by the AMF.

At operation 312, the AMF 132 communicates the Enhanced Coverage Restriction information to the UE in, e.g., a Registration Accept message (or another type of message) via an N1 interface. At operation 310, the AMF 132 can also provide an Enhanced Coverage Restriction information to the RAN via N2 signaling. At operation 314, the UE can use the Enhanced Coverage Restriction information to determine whether or not EC is restricted.

In some aspects, different or new service operation may be used between PCF and AMF for carrying Enhanced Coverage restriction information.

In some aspects, EC restriction may be controlled via NEF, which can enable $3^{rd}$ party service providers to query the status of enhanced coverage restriction or enable/disable enhanced coverage restriction per individual UEs.

Figure 4:
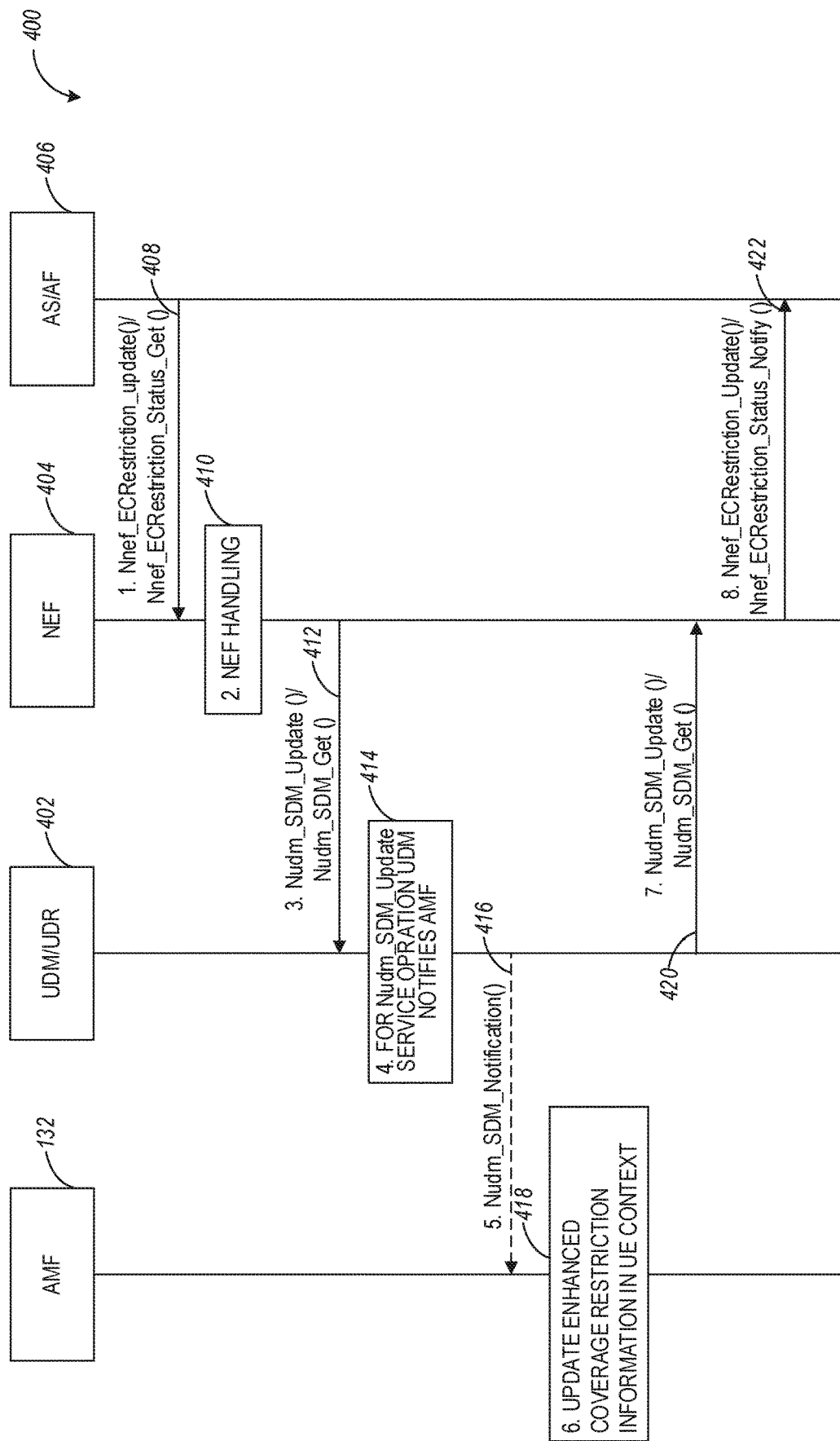
FIG. 4 illustrates a communication flow diagram for enhanced coverage restriction control using UDM/QDR communication, in accordance with some aspects.

FIG. 4 illustrates a communication flow diagram for enhanced coverage restriction control using UDM/QDR communication, in accordance with some aspects. More specifically, the communication flow diagram 400 can take place between the following network entities: UE 101, UDM/UDR 402, NEF 404, and application server (AS) or application function (AF) 406. The UDM 402 can be the same as UDM/HSS 146 in FIG. 1E. UDR can be a universal data repository within a 5G architecture.

At operation 408, the AF/AS 406 uses, e.g., Nnef_ECRestriction_Update ( ) request service operation in order to enable/disable Enhanced Coverage restriction, or uses, e.g., Nnef_ECRestriction_Status_Get ( ) service operation to query the status of enhanced coverage restriction. Both service operations can include an External Identifier or MSISDN and AS/AF Identifier as required input. Enhanced Coverage Restriction Data provides an indication to either enable or disable the enhanced coverage restriction and is required input for Nnef_ECRestriction_Update ( ) request service operation only.

At operation 410, if either the AS/AF 406 is not authorized to perform this request (e.g., if the service level agreement or SLA does not allow for it), or the AS/AF 406 has exceeded its quota or rate of submitting Enhanced Coverage requests, the NEF 404 indicates service operation failure to the AS/AF 406 with appropriate cause code and the flow stops here. Otherwise, the flow continues to operation 412.

At operation 412, the NEF 404 uses Nudm_SDM_Update ( ) service operation to update the subscription data for Enhanced Coverage restriction. The NEF 404 uses Nudm_SDM_Get ( ) service operation to query the status of for Enhanced Coverage restriction. The UDM 404 may retrieve this information from the UDR by using, e.g., an Nudr_UDM_Query ( ) service operation.

At operation 414, for Nudm_SDM_Update ( ) when the subscriber data for Enhanced Coverage restriction is updated at the UDM, the serving NF (i.e., AMF in this case) is notified with the updated Enhanced Coverage restriction information in the subscription data. The AMF may subscribe for the notification for Enhanced Coverage restriction information change.

In aspects when the Nudm_SDM_Get ( ) service operation is used, operations 416 and 418 are skipped.

At operation 416, the UDM 402 uses, e.g., Nudm_SDM_Notification ( ) service operation and provides the AMF with updated Enhanced Coverage restriction information.

At operation 418, the AMF 132 updates the Enhanced Coverage restriction information stored in the UE context at the AMF. The AMF 132 can transfer the Enhanced Coverage Restriction Information stored as part of its UE context during an AMF change. The UE can be informed of the updated Enhanced Coverage Restricted information at the next Registration procedure, or based on the local policy, the network can de-register the UE indicating re-registration is required.

At operation 420, the UDM 402 communicates a response of Nudm_SDM_Update ( )/Nudm_SDM_Get ( ) service operation to the NEF 404.

At operation 422, the NEF 404 communicates a response of Nnef_ECRestriction_Update ( )/Nnef_ECRestriction_Status_Get ( ) service operation to the AS/AF 406.

Service operations discussed above are examples. In some aspects, different or new service operations may be used between different network function (e.g. between AS/AF<->NEF, NEF<->UDM, UDM<->AMF) to query status of enhanced coverage restriction or enable/disable enhanced coverage restriction per individual UEs.

Figure 5:
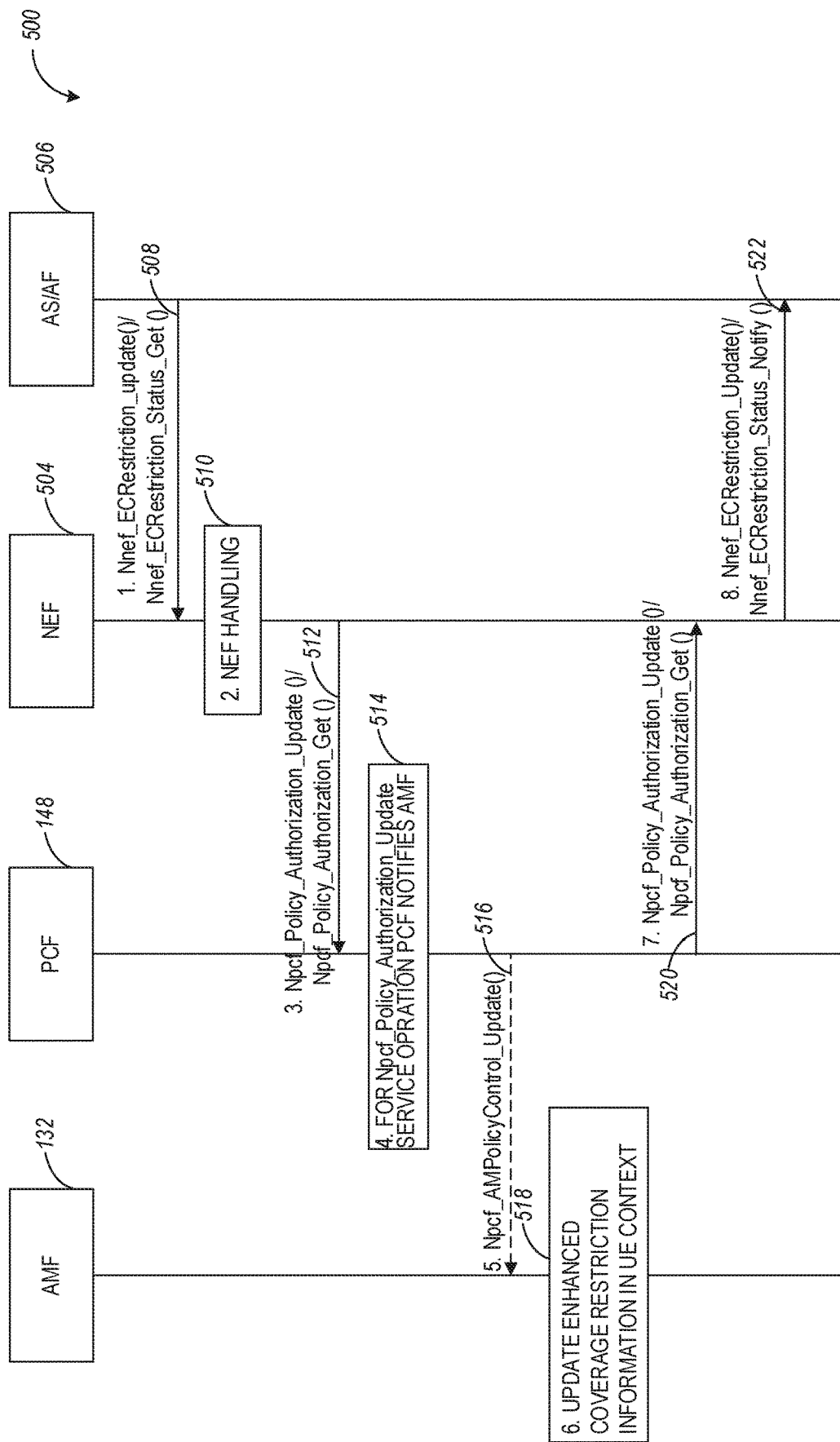
FIG. 5 illustrates a communication flow diagram for enhanced coverage restriction control using PCF communication, in accordance with some aspects.

FIG. 5 illustrates a communication flow diagram for enhanced coverage restriction control using PCF communication, in accordance with some aspects. More specifically, the communication flow diagram 500 can take place between the following network entities: UE 101, PCF 148, NEF 504, and AS/AF 506.

At operation 508, the AF/AS 506 uses, e.g., an Nnef_ECRestriction_Update ( ) request service operation in order to enable/disable Enhanced Coverage restriction, or uses, e.g., an Nnef_ECRestriction_Status_Get ( ) service operation to query the status of enhanced coverage restriction. Both service operations include External Identifier or MSISDN and AS/AF Identifier as required input. Enhanced Coverage Restriction Data provides an indication to either enable or disable the enhanced coverage restriction, and can be required input for the Nnef_ECRestriction_Update ( ) request service operation only.

At operation 510, if either the AS/AF 506 is not authorized to perform this request (e.g., if the SLA does not allow for it), or the AS/AF 506 has exceeded its quota or rate of submitting Enhanced Coverage requests, the NEF 504 indicates service operation failure to the AS/AF 506 with appropriate cause code and flow stops here. Otherwise, the processing flow can continue to operation 512.

At operation 512, the NEF 504 uses, e.g., an Npcf_Policy_Authorization_Update ( ) service operation to update the Enhanced Coverage restriction policy at the PCF 148. The NEF 504 uses, e.g., an Npcf_Policy_Authorization_Get ( ) service operation to query the status of for Enhanced Coverage restriction policy at the PCF 148. The PCF 148 may retrieve this information from the UDR by using, e.g., an Nudr_UDM_Query ( ) service operation.

At operation 514, for Npcf_Policy_Authorization_Update ( ) when the subscriber data for Enhanced Coverage restriction is updated at the PCF 148, the serving NF (i.e., the AMF in this case) is notified with the updated Enhanced Coverage restriction information. The AMF 132 may subscribe for the notification for Enhanced Coverage restriction information change with the PCF 148.

In aspects when an Nudm_SDM_Get ( ) service operation is used, operations 516 and 518 are skipped.

At operation 516, the PCF 148 uses, e.g., an Npcf_AMPolicyControl_Update ( ) service operation and provides the AMF 132 with updated Enhanced Coverage restriction information.

At operation 518, the AMF 132 updates Enhanced Coverage restriction information stored in the UE context at the AMF. The AMF 132 can transfer the Enhanced Coverage Restricted Information stored as part of its UE context during an AMF change. In some aspects, the UE is informed of the updated Enhanced Coverage Restricted information at the next registration procedure or based on the local policy the network can de-register the UE indicating re-registration is required.

At operation 520, the PCF 148 communicates a response of the Npcf_Policy_Authorization_Update ( )/Npcf_Policy_Authorization_Get ( ) service operation to the NEF 504.

At operation 522, the NEF 504 communicates a response of the Nnef_ECRestriction_Update ( )/Nnef_ECRestriction_ Status_Get ( ) service operation to the AS/AF 506.

Service operations discussed above are examples. In some aspects, different or new service operations may be used between different network function (e.g. between AS/AF<->NEF, NEF<->PCF, PCF<->AMF) to query status of enhanced coverage restriction or enable/disable enhanced coverage restriction per individual UEs.

In some aspects, the following can be performed by a UE in connection with EC-related functions: provide Enhanced Coverage support capability indication to the AMF; receive Enhanced Coverage Restriction Information as part of N1 procedure (i.e., during an initial or periodic Registration Accept); and store Enhanced Coverage Restriction Information per PLMN and use Enhanced Coverage mode based on Enhanced Coverage restriction Information provided by the AMF.

In some aspects, the following can be performed by a RAN in connection with EC-related functions: receives an Enhanced Coverage Restriction information from the AMF via N2 signalling whenever the UE context is established in the RAN, e.g., during N2 Paging procedure, Service Request procedure, initial registration, and periodic registration procedure; and determine whether the UE is restricted to operate in Enhanced Coverage mode based on the Enhanced Coverage Restriction information provided by the AMF.

In some aspects, the following can be performed by an AMF in connection with EC-related functions: receive Enhanced Coverage Restriction information as part of subscription data from the UDM; based on local configuration, UE usage setting, UE subscription information and network policies, or any combination thereof, determine whether Enhanced Coverage (i.e. CE mode B or both CE mode B and CE mode A) is restricted for the UE; store Enhanced Coverage Restriction information as part of the UE context in the AMF; provide an Enhanced Coverage Restriction information to the UE via N1 signalling (i.e. during N2 during initial Registration and periodic Registration procedure); and provide an Enhanced Coverage Restriction information to the (R)AN via N2 signalling whenever the UE context is established in the RAN, e.g., during an N2 paging procedure, a service request procedure, an initial registration, and a periodic registration procedure.

In some aspects, the following can be performed by an UDM/UDR in connection with EC-related functions: contains Enhanced Coverage Restriction information as part of subscription data; UDM may retrieve such data from the UDR; support new Nudm_SDM_Update ( ) service operation with NEF as consumer to update the subscription data for Enhanced Coverage restriction; and interface with NEF to provide status of Enhanced Coverage restriction using updated Nudm_SDM_Update ( ) service operation with NEF as consumer.

In some aspects, the following can be performed by a NEF in connection with EC-related functions: support new Nnef_ECRestriction_Update ( ) request service operation with AS/AF as consumer in order to enable/disable Enhanced Coverage restriction; and support new Nnef_ECRestriction_Status_Get ( ) service operation with AS/AF as consumer to query the status of enhanced coverage restriction.

In some aspects, the following can be performed by a PCF in connection with EC-related functions: contains Enhanced Coverage Restriction information policy (PCF can retrieve it from the UDR); support new service operation with NEF as consumer to update the subscription data for Enhanced Coverage restriction; interface with NEF to provide status of Enhanced Coverage restriction using new service operation with NEF as consumer; and interface with AMF to provide Enhanced Coverage restriction policy.

Figure 6:
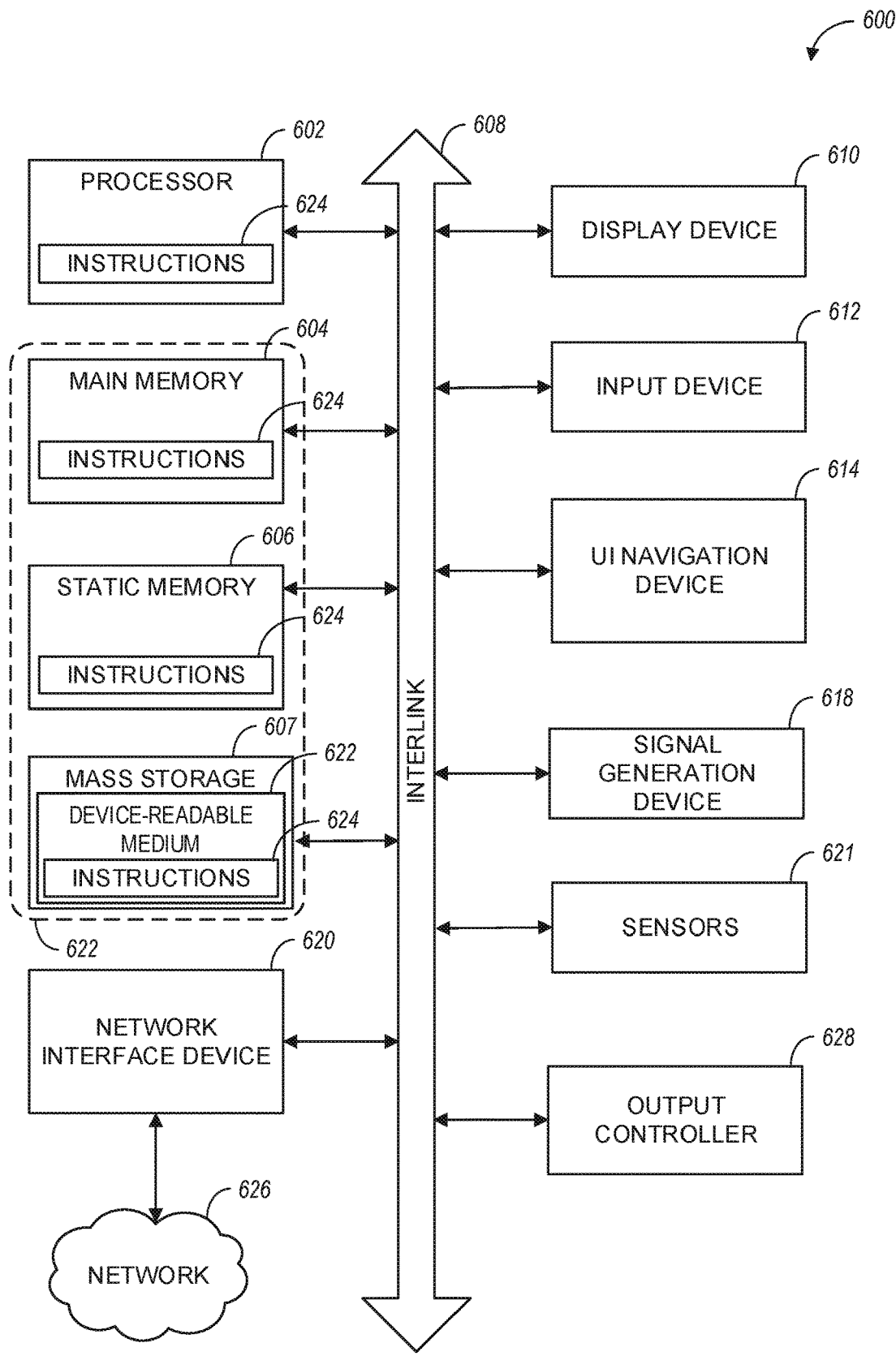
FIG. 6 illustrates a block diagram of a communication device such as an evolved Node-B (eNB), a new generation Node-B (gNB), an access point (AP), a wireless station (STA), a mobile station (MS), or a user equipment (UE), in accordance with some aspects.

FIG. 6 illustrates a block diagram of a communication device such as an evolved Node-B (eNB), a next generation Node-B (gNB), an access point (AP), a wireless station (STA), a mobile station (MS), or a user equipment (UE), in accordance with some aspects and to perform one or more of the techniques disclosed herein. In alternative aspects, the communication device 600 may operate as a standalone device or may be connected (e.g., networked) to other communication devices.

Circuitry (e.g., processing circuitry) is a collection of circuits implemented intangible entities of the device 600 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 600 follow.

In some aspects, the device 600 may operate as a standalone device or may be connected (e.g., networked) to other devices. In a networked deployment, the communication device 600 may operate in the capacity of a server communication device, a client communication device, or both in server-client network environments. In an example, the communication device 600 may act as a peer communication device in peer-to-peer (P2P) (or other distributed) network environment. The communication device 600 may be a UE, eNB, PC, a tablet PC, a STB, a PDA, a mobile telephone, a smartphone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. The software may accordingly configure a hardware processor, for example, to constitute a particular module at one instance of time and to constitute a different module at a different instance of time.

Communication device (e.g., UE) 600 may include a hardware processor 602 (e.g., a central processing unit (CPU), a graphics processing unit (GPU), a hardware processor core, or any combination thereof), a main memory 604, a static memory 606, and mass storage 607 (e.g., hard drive, tape drive, flash storage, or other block or storage devices), some or all of which may communicate with each other via an interlink (e.g., bus) 608.

The communication device 600 may further include a display device 610, an alphanumeric input device 612 (e.g., a keyboard), and a user interface (UI) navigation device 614 (e.g., a mouse). In an example, the display device 610, input device 612 and UI navigation device 614 may be a touchscreen display. The communication device 600 may additionally include a signal generation device 618 (e.g., a speaker), a network interface device 620, and one or more sensors 621, such as a global positioning system (GPS) sensor, compass, accelerometer, or another sensor. The communication device 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 607 may include a communication device-readable medium 622, on which is stored one or more sets of data structures or instructions 624 (e.g., software) embodying or utilized by any one or more of the techniques or functions described herein. In some aspects, registers of the processor 602, the main memory 604, the static memory 606, and/or the mass storage 607 may be, or include (completely or at least partially), the device-readable medium 622, on which is stored the one or more sets of data structures or instructions 624, embodying or utilized by any one or more of the techniques or functions described herein. In an example, one or any combination of the hardware processor 602, the main memory 604, the static memory 606, or the mass storage 616 may constitute the device-readable medium 622.

As used herein, the term "device-readable medium" is interchangeable with "computer-readable medium" or "machine-readable medium". While the communication device-readable medium 622 is illustrated as a single medium, the term "communication device-readable medium" may include a single medium or multiple media (e.g., a centralized or distributed database, and/or associated caches and servers) configured to store the one or more instructions 624.

The term "communication device-readable medium" is inclusive of the terms "machine-readable medium" or "computer-readable medium", and may include any medium that is capable of storing, encoding, or carrying instructions (e.g., instructions 624) for execution by the communication device 600 and that cause the communication device 600 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 624 may further be transmitted or received over a communications network 626 using a transmission medium via the network interface device 620 utilizing any one of a number of transfer protocols. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input-multiple-output (SIMO), MIMO, or multiple-input-single-output (MISO) techniques. In some examples, the network interface device 620 may wirelessly communicate using Multiple User MIMO techniques.

The term "transmission medium" shall be taken to include any intangible medium that is capable of storing, encoding or carrying instructions for execution by the communication device 600, and includes digital or analog communications signals or another intangible medium to facilitate communication of such software. In this regard, a transmission medium in the context of this disclosure is a device-readable medium.

A communication device-readable medium may be provided by a storage device or other apparatus which is capable of hosting data in a non-transitory format. In an example, information stored or otherwise provided on a communication device-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the communication device-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

Although an aspect has been described with reference to specific exemplary aspects, it will be evident that various modifications and changes may be made to these aspects without departing from the broader scope of the present disclosure. Accordingly, the specification and drawings are to be regarded in an illustrative rather than a restrictive sense. This Detailed Description, therefore, is not to be taken in a limiting sense, and the scope of various aspects is defined only by the appended claims, along with the full range of equivalents to which such claims are entitled.

What is claimed is:

1. An apparatus of a user equipment (UE), the apparatus comprising:
    processing circuitry, wherein to configure the UE for enhanced coverage (EC) in a 5G network, the processing circuitry is to:
        encode N1 configuration request signaling for transmission to an Access and Mobility Function (AMF) of the 5G network, the N1 configuration request signaling including an EC support capability indication of whether the UE supports restriction for EC;
        decode N1 configuration response signaling from the AMF, the N1 configuration response signaling including EC restriction information, wherein the EC restriction information is determined based on the EC support capability indication and subscription information of the UE;
        perform an EC restriction determination using the EC restriction information, the EC restriction determination to determine a coverage enhancement (CE) mode of operation; and select a cell from a plurality of available cells within the 5G network based on the enhanced coverage restriction determination; and memory coupled to the processing circuitry, the memory configured to store the EC restriction information.

2. The apparatus of claim 1, wherein the EC restriction information indicates one of:
CE Mode B is restricted for the UE;
CE Mode A and CE Mode B are both restricted for the UE; and
CE Mode A and CE Mode B are both not restricted for the UE.

3. The apparatus of claim 1, wherein the subscription information indicates whether the UE subscribes for enhanced coverage.

4. The apparatus of claim 1, wherein the subscription information is retrieved from a Unified Data Management (UDM) server or from a Universal Data Repository (UDR) of the 5G network.

5. The apparatus of claim 1, wherein the subscription information is retrieved from a Policy Control Function (PCF) of the 5G network using a Npcf service operation.

6. The apparatus of claim 1, wherein the N1 configuration request signaling is one of an initial registration request message, a periodic registration request message, and a service request message communicated to the AMF via a N1 interface.

7. The apparatus of claim 1, wherein the N1 configuration response signaling is a N1 registration accept message.

8. The apparatus of claim 1, further comprising transceiver circuitry coupled to the processing circuitry; and, one or more antennas coupled to the transceiver circuitry.

9. An apparatus of a network node providing an Access and Mobility Function (AMF) within a 5G network, the network node comprising:
processing circuitry, wherein to configure a User Equipment (UE) for enhanced coverage (EC) within the 5G network, the processing circuitry is to:
decode N1 configuration request signaling from the UE, the N1 configuration request signaling including an EC support capability indication of whether the UE supports restriction for EC;
retrieving access and mobility subscription information for the UE, the access and mobility subscription information indicating whether the UE subscribes for enhanced coverage;
determine EC restriction information for the UE based on the EC support capability indication and the access and mobility subscription information; and
encode N1 configuration response signaling for transmission to the UE, the N1 configuration response signaling including the determined EC restriction information; and
memory coupled to the processing circuitry, the memory configured to store the EC restriction information.

10. The apparatus of claim 9, wherein the processing circuitry is further to:
retrieve the access and mobility subscription information from a Unified Data Management (UDM) server of the 5G network using a Nudm_SDM_Get service operation.

11. The apparatus of claim 9, wherein the processing circuitry is further to:
retrieve the access and mobility subscription information from a Universal Data Repository (UDR) of the 5G network using a Nudr_UDM_Query service operation; and store the determined EC restriction information in a UE context associated with the UE.

12. The apparatus of claim 9, wherein the EC restriction information indicates one of:
coverage enhancement (CE) Mode B is restricted for the UE;
CE Mode A and CE Mode B are both restricted for the UE; and
CE Mode A and CE Mode B are both not restricted for the UE.

13. The apparatus of claim 9, wherein the processing circuitry is further to:
retrieve the access and mobility subscription information from a Policy Control Function (PCF) of the 5G network using a Npcf service operation.

14. The apparatus of claim 9, wherein the processing circuitry is further to:
decode an EC restriction update information received from a Unified Data Management (UDM) server or a Universal Data Repository (UDR) of the 5G network.

15. The apparatus of claim 14, wherein the processing circuitry is further to:
update the access and mobility subscription information stored in a UE context associated with the UE, based on the EC restriction update information.

16. A non-transitory computer-readable storage medium that stores instructions for execution by one or more processors of a user equipment (UE) operating in a 5G network, the instructions to configure the one or more processors to cause the UE to:
encode N1 configuration request signaling for transmission to an Access and Mobility Function (AMF) of the 5G network, the N1 configuration request signaling including an enhanced coverage (EC) support capability indication of whether the UE supports restriction for EC;
decode N1 configuration response signaling from the AMF, the N1 configuration response signaling including EC restriction information, wherein the EC restriction information is determined based on the EC support capability indication and subscription information of the UE;
perform an EC restriction determination using the EC restriction information, the EC restriction determination to determine a coverage enhancement (CE) mode of operation; and
select a cell from a plurality of available cells within the 5G network based on the enhanced coverage restriction determination.

17. The non-transitory computer-readable storage medium of claim 16, wherein the EC restriction information indicates one of:
CE Mode B is restricted for the UE;
CE Mode A and CE Mode B are both restricted for the UE; and
CE Mode A and CE Mode B are both not restricted for the UE.

18. The non-transitory computer-readable storage medium of claim 16, wherein the subscription information indicates whether the UE subscribes for enhanced coverage.

19. The non-transitory computer-readable storage medium of claim 16, wherein the subscription information is retrieved from:
a Unified Data Management (UDM) server or from a Universal Data Repository (UDR) of the 5G network; or a Policy Control Function (PCF) of the 5G network using a Npcf service operation.

20. The non-transitory computer-readable storage medium of claim 16, wherein:
the N1 configuration request signaling is one of an initial registration request message, a periodic registration request message, and a service request message communicated to the AMF via a N1 interface; and
the N1 configuration response signaling is a N1 registration accept message.

* * * * *